US005704503A

United States Patent [19]
Krishnakumar et al.

[11] Patent Number: 5,704,503
[45] Date of Patent: Jan. 6, 1998

[54] HOT-FILLABLE PLASTIC CONTAINER WITH TALL AND SLENDER PANEL SECTION

[75] Inventors: Suppayan M. Krishnakumar, Nashua; Wayne N. Collette, Merrimack, both of N.H.

[73] Assignee: Continental PET Technologies, Inc., Florence, Ky.

[21] Appl. No.: 331,041

[22] Filed: Oct. 28, 1994

[51] Int. Cl.[6] .................. B65D 1/02; B65D 1/42; B65D 23/08
[52] U.S. Cl. .................. 215/381; 215/382; 220/671; 220/675
[58] Field of Search .................. 215/381, 382, 215/384, 900; 220/671, 675, 771

[56] References Cited

U.S. PATENT DOCUMENTS

| | | | |
|---|---|---|---|
| D. 295,381 | 4/1988 | Papa | D9/392 |
| D. 315,869 | 4/1991 | Collette | D9/392 |
| 4,749,092 | 6/1988 | Sugiura et al. | 215/1 |
| 4,805,788 | 2/1989 | Asiho | 215/381 |
| 4,818,575 | 4/1989 | Hirata et al. | 428/36.7 |
| 4,863,046 | 9/1989 | Collette et al. | 215/1 |
| 4,993,565 | 2/1991 | Ota et al. | 215/1 |
| 5,054,632 | 10/1991 | Alberghini et al. | 215/1 |
| 5,064,081 | 11/1991 | Hayashi et al. | 215/1 |
| 5,092,475 | 3/1992 | Krishnajmar et al. | 215/382 X |
| 5,178,289 | 1/1993 | Krishnakumar et al. | 215/1 |
| 5,238,129 | 8/1993 | Ota | 215/381 |
| 5,255,889 | 10/1993 | Collette et al. | 249/102 |
| 5,279,433 | 1/1994 | Krishnakumar et al. | 220/675 X |
| 5,303,833 | 4/1994 | Hayashi et al. | 215/381 |
| 5,303,834 | 4/1994 | Krishnakumar et al. | 220/675 X |
| 5,337,909 | 8/1994 | Vailliencourt | 215/1 |
| 5,341,946 | 8/1994 | Vailliencourt et al. | 215/1 |

FOREIGN PATENT DOCUMENTS

| | | |
|---|---|---|
| 0 279 628 | 8/1988 | European Pat. Off. . |
| 40565158 | 3/1993 | Japan .................. 220/675 |
| Wo 94/18077 | 8/1994 | WIPO . |

OTHER PUBLICATIONS

Australian Design Application No. 3503/93 filed Nov. 5, 1993.
Australian Design Application No. 3629/93 filed Nov. 17, 1993.
Austrailian Design Application No. 1475/94 filed May 12, 1994.
Schweppes Sport Plus Bottle (Jul. 1994) Drawing Page.
Color photo of a glass Mott's Apple Juice Bottle.
Color photo of a Tropicana Twister Light Bottle.
Color photo of a Poconos Springs Water Bottle.

*Primary Examiner*—Sue A. Weaaver
*Attorney, Agent, or Firm*—Wolf, Greenfield & Sakcs, P.C.

[57] ABSTRACT

A panel design for a hot-fillable plastic container has a tall and slender panel section. The panel configuration provides increased resistance to longitudinal bending and hoop failure, yet provides good hoop flexibility to maximize vacuum panel movement. The panel section has a substantially cylindrical circumference with a plurality of vacuum panels symmetrically disposed about the panel circumference, post walls between the vacuum panels, and land areas above and below the vacuum panels. The ratio of vacuum panel height D to panel diameter C is on the order of 0.85 to 1.05. Longitudinal post ribs are provided in the post walls. The land areas above and below the vacuum panels are of a height E greater than on the order of 0.45 inch, and the ratio of the land area height E to panel diameter C is on the order of greater than 0.1. Circumferential hoop ribs are provided in the land areas to prevent ovalization and hoop collapse.

27 Claims, 10 Drawing Sheets

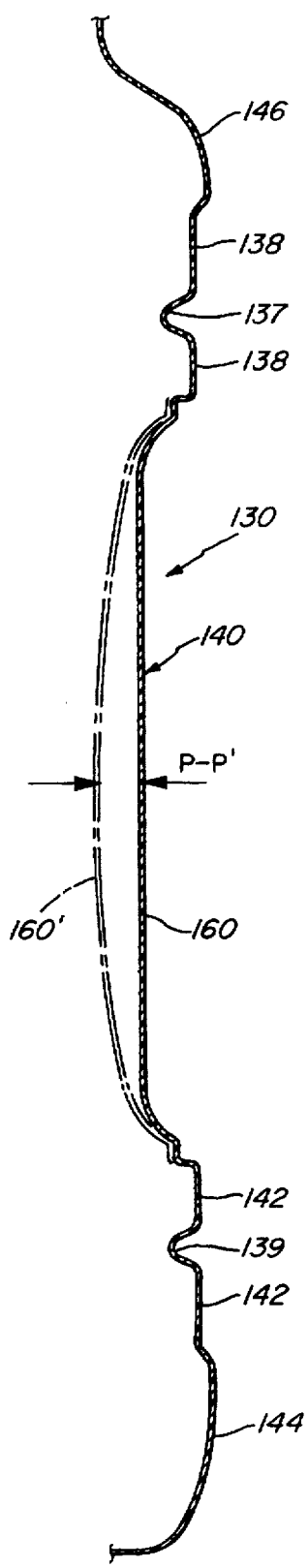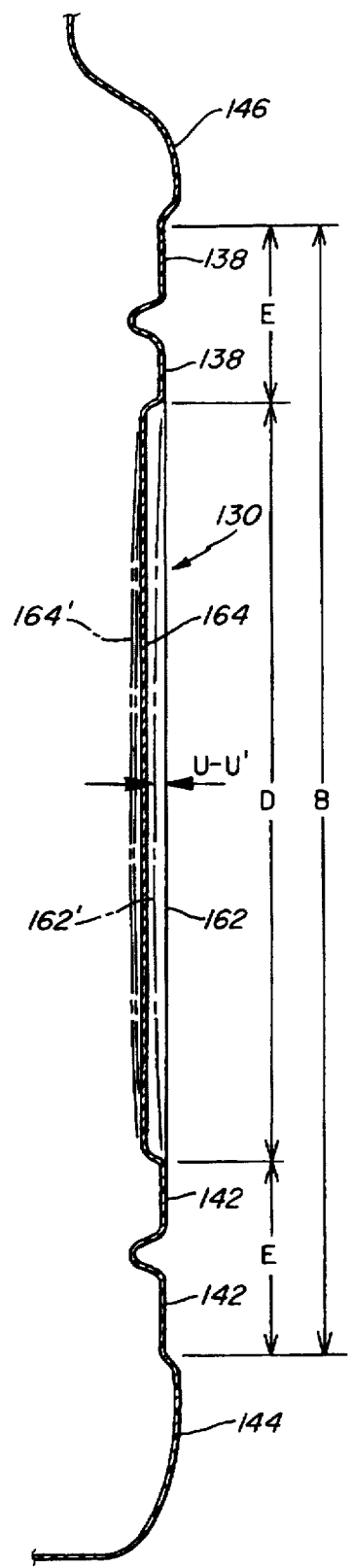
Fig. 4                    Fig. 5

HOT-FILLABLE PLASTIC CONTAINER WITH TALL AND SLENDER PANEL SECTION

FIELD OF THE INVENTION

The present invention relates to a panel design for a hot-fillable plastic container having a tall and slender panel section, and more particularly to providing such a panel section with increased resistance to longitudinal bending and hoop collapse.

BACKGROUND OF THE INVENTION

Hot-fill containers are designed for the packaging of liquids which must be placed in the container while hot to provide for adequate sterilization. During filling, the container is subjected to elevated temperatures on the order of 180°–185° F. (the product temperature) and positive internal pressures on the order of 2–5 psi (the filling line pressure). The container is then capped and as the product cools a negative internal pressure is formed in the sealed container.

Biaxially-oriented polyethylene terephthalate (PET) beverage bottles have been designed to receive a hot-fill product with a minimum of thermal shrinkage and distortion. Such a bottle is described in U.S. Pat. No. 4,863,046 entitled "Hot Fill Container," which issued Sep. 5, 1989 to Collette et al. The Collette et al. container is provided with a plurality of recessed vacuum panels in the middle panel section of the container, which reduce the magnitude of the vacuum generated in the filled and capped container to prevent any large uncontrolled shape distortion. As the product cools, the vacuum panels (all of them) deform and move inwardly in unison. A wrap-around label covers the vacuum panels and is supported by raised central wall portions in the vacuum panels, post areas between the vacuum panels, and horizontal glue land areas above and below the vacuum panels. Longitudinal (vertical) recessed ribs may be provided in the post areas and raised wall portions of the panels to increase the longitudinal stiffness of the panel section.

The design of the vacuum panels may vary; other designs are illustrated in: 1) U.S. Design Pat. 315,869, "Container Body For Liquids Or The Like," Apr. 2, 1991 to Collette; 2) U.S. Pat. No. 5,255,889, "Modular Mold," Oct. 26, 1993 to Collette et al.; 3) U.S. Pat. No. 5,178,289, "Panel Design For A Hot-Fillable Container," Jan. 12, 1993 to Krishnakumar et al.; and 4) U.S. Pat. No. 5,303,834, "Squeezable Container Resistant To Denting," Apr. 19, 1994 to Krishnakumar et al., each of which is hereby incorporated by reference in its entirety.

There is a need for a hot-fillable plastic container having a tall and slender panel section, in order to accommodate a long label or to achieve a certain volume capacity for a given panel diameter. This tall and slender configuration makes it more difficult to withstand the increase in pressure during filling and to provide a uniform vacuum collapse during cooling. More specifically, it is difficult to make the long and narrow vacuum panels sufficiently flexible to achieve the necessary deformation under vacuum, and at the same time make the surrounding land areas and post walls sufficiently rigid to withstand collapse. In particular, it would be desirable to provide a relatively tall and slender sport bottle, such as the type used by runners and bicyclists, which can be hot-filled directly by the beverage manufacturer. Instead, most hot-fill beverages today are sold in larger containers and transferred by the user to a separate polyethylene sport bottle.

SUMMARY OF THE INVENTION

This invention provides a tall and slender panel section for a hot-fillable plastic container having increased resistance to longitudinal bending and hoop collapse, while still providing high hoop flexibility for maximum movement of the vacuum panels. To prevent uncontrolled longitudinal buckling of the panel post walls, longitudinal post ribs are provided and a limit on the ratio of the vacuum panel height to panel diameter is specified. More specifically, the ratio of vacuum panel height D to panel diameter C (see FIG. 1) is on the order of 0.85 to 1.05. To prevent ovalization or hoop collapse in the panel section, horizontal hoop ribs are provided in the land areas above and below the vacuum panels. Such hoop ribs are required where the land areas are of a height E greater than on the order of 0.45 inches, and where the container has a ratio of land area height E to panel diameter C on the order of greater than 0.1.

A specific embodiment is described having six symmetrically disposed vacuum panels. Alternatively, four or eight vacuum panels may be provided. The tall and slender panel section generally has a ratio of panel height B to panel diameter C on the order of 1.2 and greater. A mold for making such a container is also described.

These and other advantages of the present invention will be more particularly described in regard to the following description and drawings of select embodiments.

BRIEF DESCRIPTION OF THE DRAWINGS

FIG. 4 is a longitudinal-sectional view of the panel section taken along section line 4—4 of FIG. 2, showing in phantom lines the deformation of the vacuum panel.

FIG. 5 is a longitudinal-sectional view of the panel section taken along section line 5—5 of FIG. 2, showing in phantom lines the deformation of the post area and post rib, and defining the relative heights of the vacuum panel and upper and lower glue land areas.

DETAILED DESCRIPTION

Figure 1:
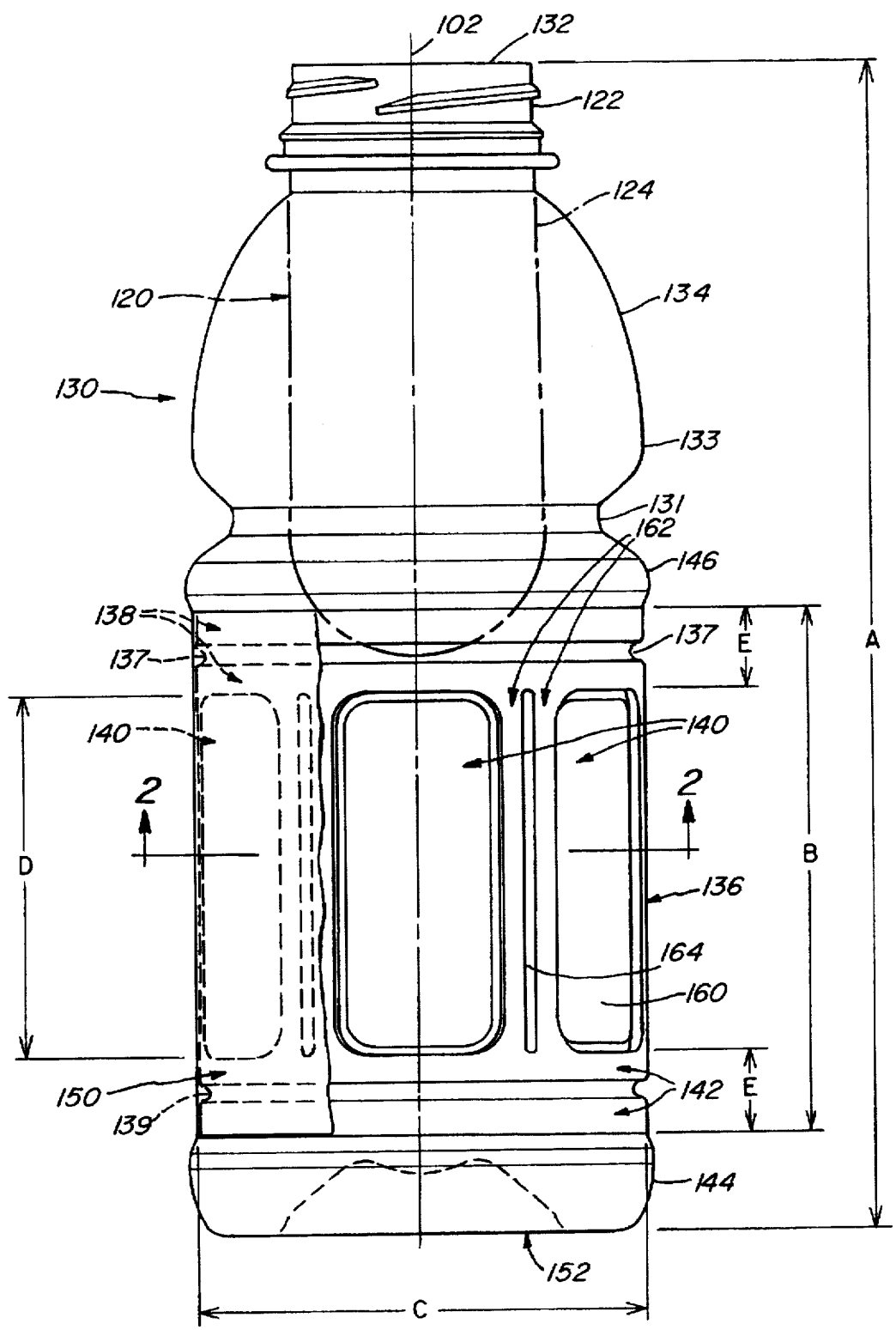
FIG. 1 is a front elevational view of a first embodiment of the hot-fillable container of this invention having six symmetrically disposed vacuum panels, with a partial label shown over a portion of the panel section.

FIG. 1 shows a particular embodiment of the present invention, namely a 20-ounce, hot-fillable PET beverage bottle. The bottle 130 is blow molded from an injection molded preform 120 (shown in phantom) having an upper thread finish 122 and a lower tube portion 124. During blowing, the preform is expanded and assumes the shape of an interior molding surface (see FIG. 10) to form a substantially transparent, biaxially-oriented bottle. The thread finish 122 is not expanded and remains the thread finish of the bottle with an open mouth 132 for receiving a screw-on cap (not shown). The lower preform tube portion 124 is expanded to form: (a) a shoulder section 134 increasing generally in diameter from the neck finish to a cylindrical panel section 136; b) the panel section 136 including upper and lower glue lands 138 and 142, vacuum panels 140, and post walls 162; and (c) a base 144. A full-wrap label is applied over the panel section 136; a portion of label 150 is shown.

The 20-oz bottle 130 has a total height A (see FIG. 1) of about 195 mm, a panel section height B of about 89 mm, a diameter C of about 72 mm, a vacuum panel height D of about 62 mm, and each of upper and lower land areas of height E of about 13.5 mm. The thickness of the container at the panel section is on the order of 0.4 mm.

In this embodiment, the lower shoulder section includes a recessed radial hoop rib 131 between enlarged diameter portions 133 and 146. The lower portion 146 forms an enlarged bumper, just above the panel section, which is of a greater diameter than the panel section, in order to protect the attached label 150 during shipment and storage. The base 144 also includes an enlarged diameter bumper 144 to protect the label. The base further includes a recessed closed bottom end 152 which may include additional deformable elements which move inwardly to reduce the negative pressure generated during product cooling.

Figure 2:
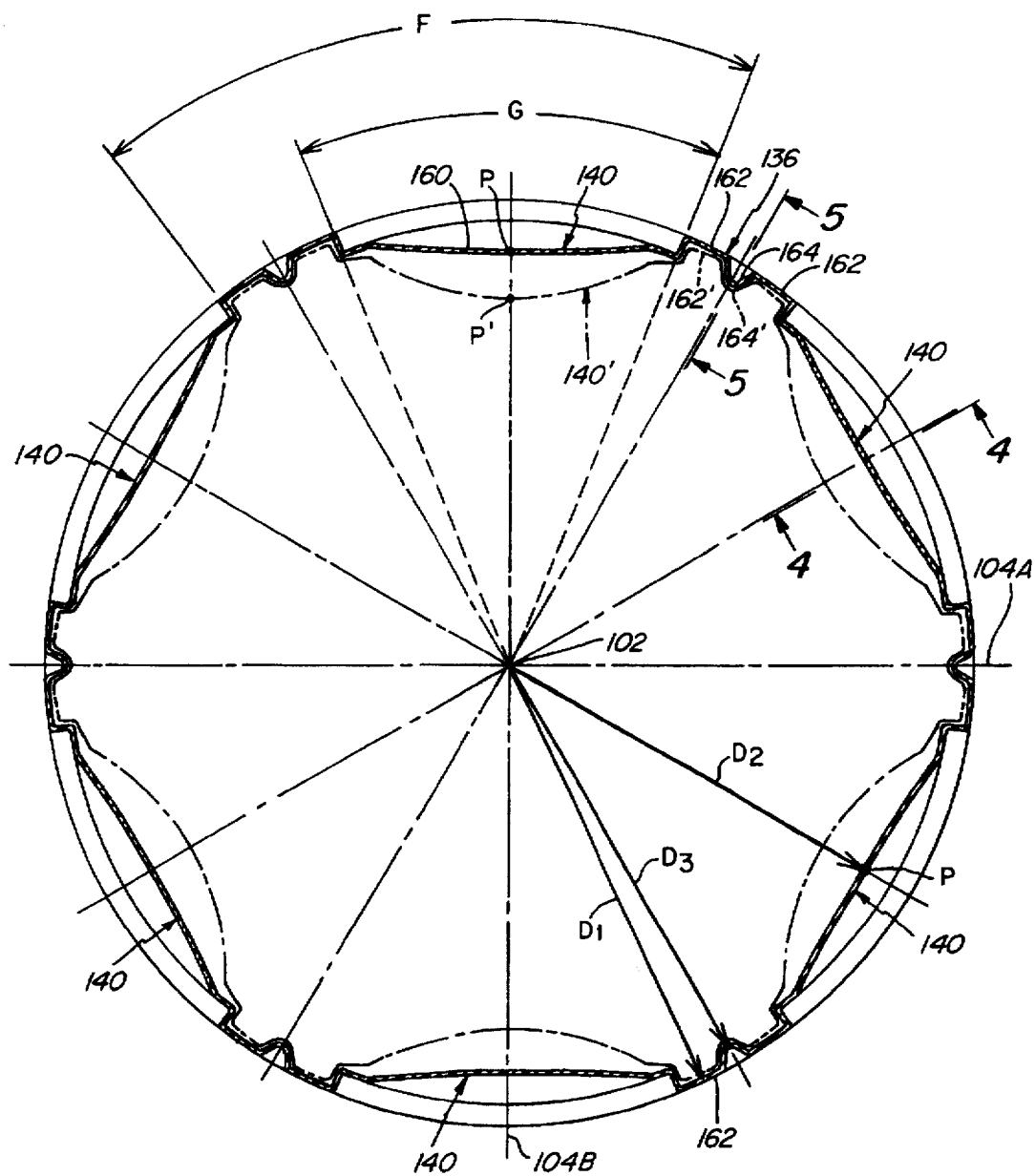
FIG. 2 is a cross-sectional view of the container of FIG. 1 taken along section line 2—2, showing six vacuum panels separated by post areas with longitudinal post ribs, and showing in phantom lines the deflection of the vacuum panels and post areas during product cooling.

The substantially cylindrical panel 136, shown in horizontal cross-section in FIG. 2, includes six recessed vacuum panels 140 symmetrically disposed about a vertical centerline 102. The panels 140 are also symmetrical about each of two orthogonal vertical planes 104A, 104B passing through the centerline 102. Each vacuum panel 140 is disposed between a pair of post walls 162, which constitute part of the outermost cylindrical panel wall disposed at a first radial distance $D_1$ from the vertical centerline 102. Each vacuum panel 140 includes a vertically-disposed rectangular recess 160 which forms an arc or other inwardly concave shape in horizontal cross-section (see FIG. 2), the midpoint P of the recess being disposed at a second distance $D_2$ from the vertical centerline 102 which is less than the first distance $D_1$ of post wall 162. A vertically-elongated and recessed post rib 164 is provided in the post wall 162 midway between each vacuum panel 140, to provide longitudinal stiffness, and is disposed a third distance $D_3$ from the vertical centerline 102 which is less than the first distance $D_1$ of the post wall 162. The post rib 164 is a relatively small-diameter arc with rounded edges for a smooth continuation into the adjoining post wall, while the vacuum panel recess 160 is a generally deeper and broader concave portion.

In this six-panel embodiment, each vacuum panel occupies an angular extent G (see FIG. 2) on the order of 39° to 46°, out of the total panel circumference of 360°. The combined angular extent F of one vacuum panel 140 and one post wall 162 is 60° (360÷6=60), leaving the post wall with an angular extent on the order of 14° to 21°. The relative angular extents of the vacuum panel and post wall are adjusted to maximize the vacuum deformation of recess 160, without allowing collapse or ovalization of the post walls 162 as described hereinafter.

FIG. 2 shows in phantom lines the controlled deformation under vacuum of the six vacuum panels and post areas. Vacuum panel 140 deforms substantially radially inwardly to deformed vacuum panel 140', while post wall 162 deforms slightly inwardly to deformed post wall 162'.

Figure 3:
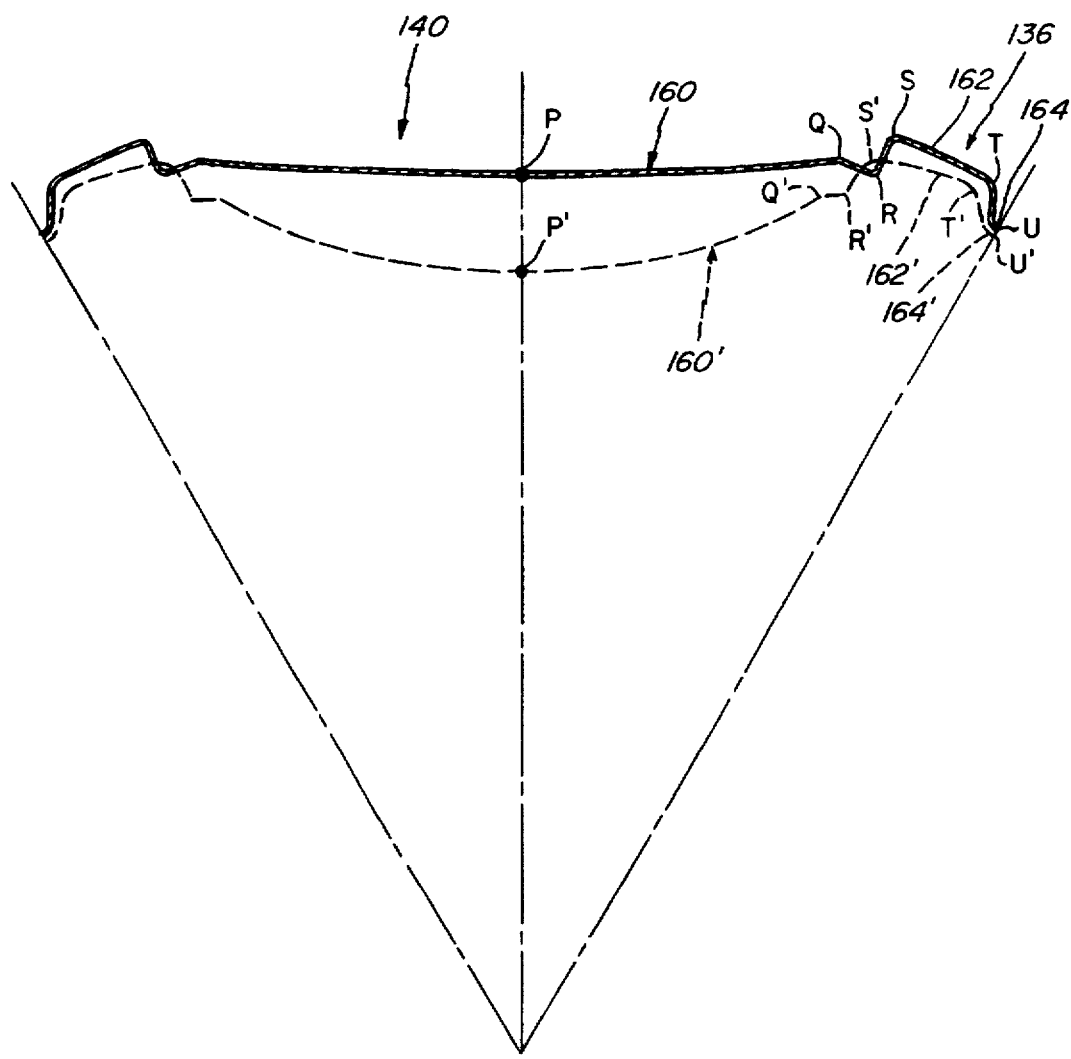
FIG. 3 is an enlarged fragmentary cross-sectional view of one vacuum panel of FIG. 2, showing in phantom lines the deformed vacuum panel and post area.

FIG. 3 shows the controlled deformation of one representative vacuum panel and the adjacent portions of the post walls. As desired, the maximum deformation occurs at the center point P of the vacuum panel 140, which moves inwardly to point P'. A much lesser deformation occurs at points Q, R, S, T, and U, defining the post wall and post rib, which deform inwardly to points Q', R', S', T', and U', respectively. The peripheral length of P' to U' is the same as that of P to U, but the radial deflection P, P' is much larger than U, U'. To maximize the inward movement of P, P', the hoop rigidity of segment PU must be lowered by providing a relatively thin wall vacuum panel section, and two corner sections Q-R-S and T-U on either side of post wall ST. The corners open up (i.e., increase in angular extent) under deformation to allow maximum inward movement of PP'. At the same time, the longitudinal bending resistance of the post wall ST is increased by maximizing the radial depth of RS and TU, and the angular extent STU. In this embodiment, STU is in the middle of the preferred range of 14° to 21° (see FIG. 3), or on the order of 7° to 10.5°. The depth RS and depth TU are preferably on the order of 0.030 to 0.100 inches.

It is important to note that the longitudinal post rib 164 lowers the hoop rigidity, while at the same time maximizing the longitudinal bending resistance. The longitudinal post ribs enable light-weighting of the label panel of the container. In a 20-oz container, the panel wall thickness with the longitudinal post ribs incorporated in this design is 20 to 25% thinner (0.010" to 0.013" vs. 0.015" to 0.016"). This translates to a panel weight reduction of 17 to 20%.

Referring again to FIG. 1, C is the diameter of the panel section and D is the height of the vacuum panel. The larger the ratio D/C, the higher the longitudinal bending moment on the post walls and the more the need for longitudinal post ribs. The longitudinal post ribs are necessary when D/C is on the order of at least 0.85. The upper limit of D/C (with post ribs) is on the order of 1.05.

The angular extent of the vacuum panel (G in FIG. 2) is on the order of 39° to 46°. If the angular extent is too low, the vacuum panel will not be sufficiently flexible. If the angular extent is too large, the post wall will not be sufficiently strong.

Referring to FIG. 1, B is the height of the panel section and E is the height of each label land area above and below the vacuum panel. To prevent ovalization of the panel and hoop collapse during vacuum deformation (i.e., a vertical crease formed above or below the vacuum panel), recessed hoop ribs 137, 139 are provided in the middle of the upper and lower glue land areas 138, 142 when E is on the order of greater than 0.45 inches, and when the ratio E/C is on the order of greater than 0.1.

The tall and slender panel section preferably has a panel height B on the order of 2.4 to 8 inches, and a panel diameter C on the order of 2 to 6 inches. The panel wall thickness is preferably on the order of 0.012 to 0.025 inches.

FIG. 4 illustrates in longitudinal cross-section the deflection of the vacuum panel 140. More specifically, the recessed vacuum panel wall 160 is deformed inwardly to 160' with a maximum deformation occurring at the vertical center point P-P'. FIG. 5 shows substantially smaller post wall and post rib deformations; the post wall 162 is deformed to 162', and the post rib 164 is deformed to 164'.

Figure 6:
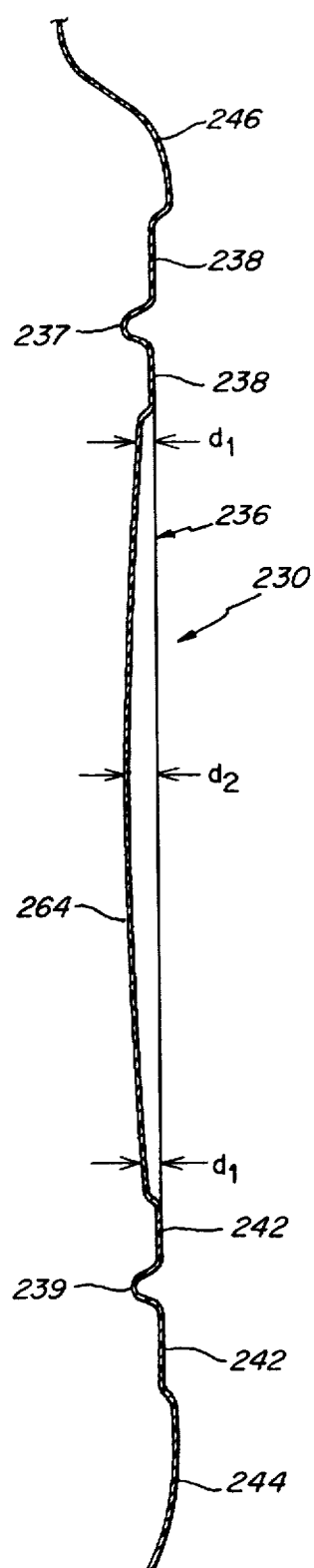
FIG. 6 is a sectional view, similar to FIG. 5, showing an alternative post rib configuration of a non-uniform depth, for maximizing the resistance to longitudinal bending at the center point of the rib.

FIG. 6 shows in longitudinal section, similar to FIG. 5, a post rib 264 of an alternative container 230. Unless otherwise indicated, container 230 is identical in all respects to container 130, and corresponding elements have been numbered by simply adding "100" to the corresponding figure number from FIG. 1, to form a "200" number series. The difference in FIG. 6 is that the post rib 264 is of variable depth in the longitudinal direction in order to maximize the resistance to longitudinal bending. More specifically, the post rib 264 has a maximum depth $d_2$ at a vertical mid-point, compared to a relatively lesser depth $d_1$ at points adjacent to the upper and lower land areas 238 and 242. The maximum depth at the mid-point provides the maximum resistance to longitudinal bending, where the bending moment is the greatest.

Figure 7:
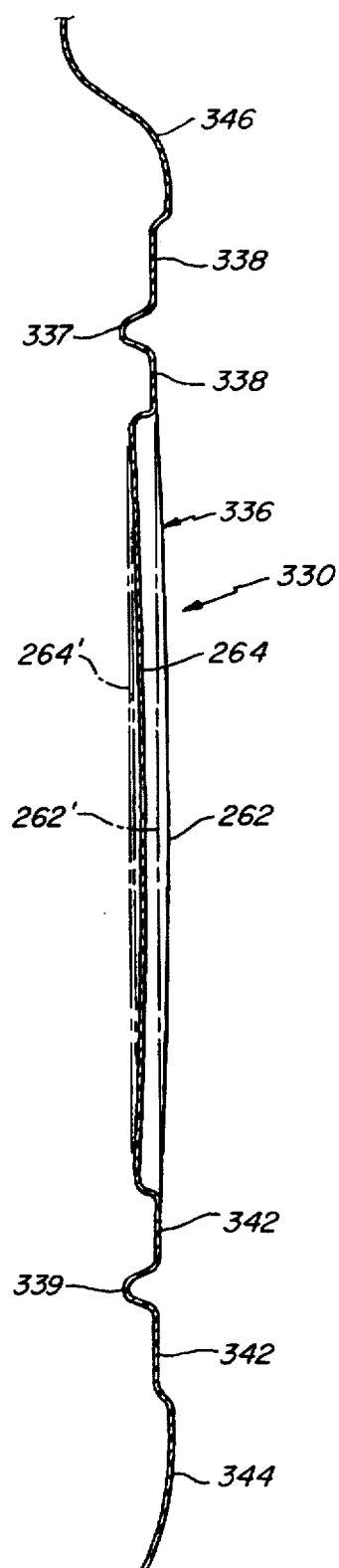
FIG. 7 is a sectional view similar to FIG. 5, showing an alternative panel configuration in which the original panel (before filling) is barrelled outwardly (solid lines) so that upon vacuum deformation it becomes substantially vertically disposed (phantom lines).

FIG. 7 is a longitudinal-sectional view of an alternative container 330 similar in all respects to the container 130 of FIG. 1, and where corresponding elements have been given a 300 series designation. However, in container 330, the panel section 336 is originally formed (i.e., blow molded) with an outwardly barrelled configuration, as shown by solid line 262 for the post wall, and solid line 264 for the post rib. Upon vacuum deformation during product cooling, the outwardly bowed post wall and post rib move radially inwardly to a substantially vertical configuration at 262' and 264', respectively.

Figure 8:
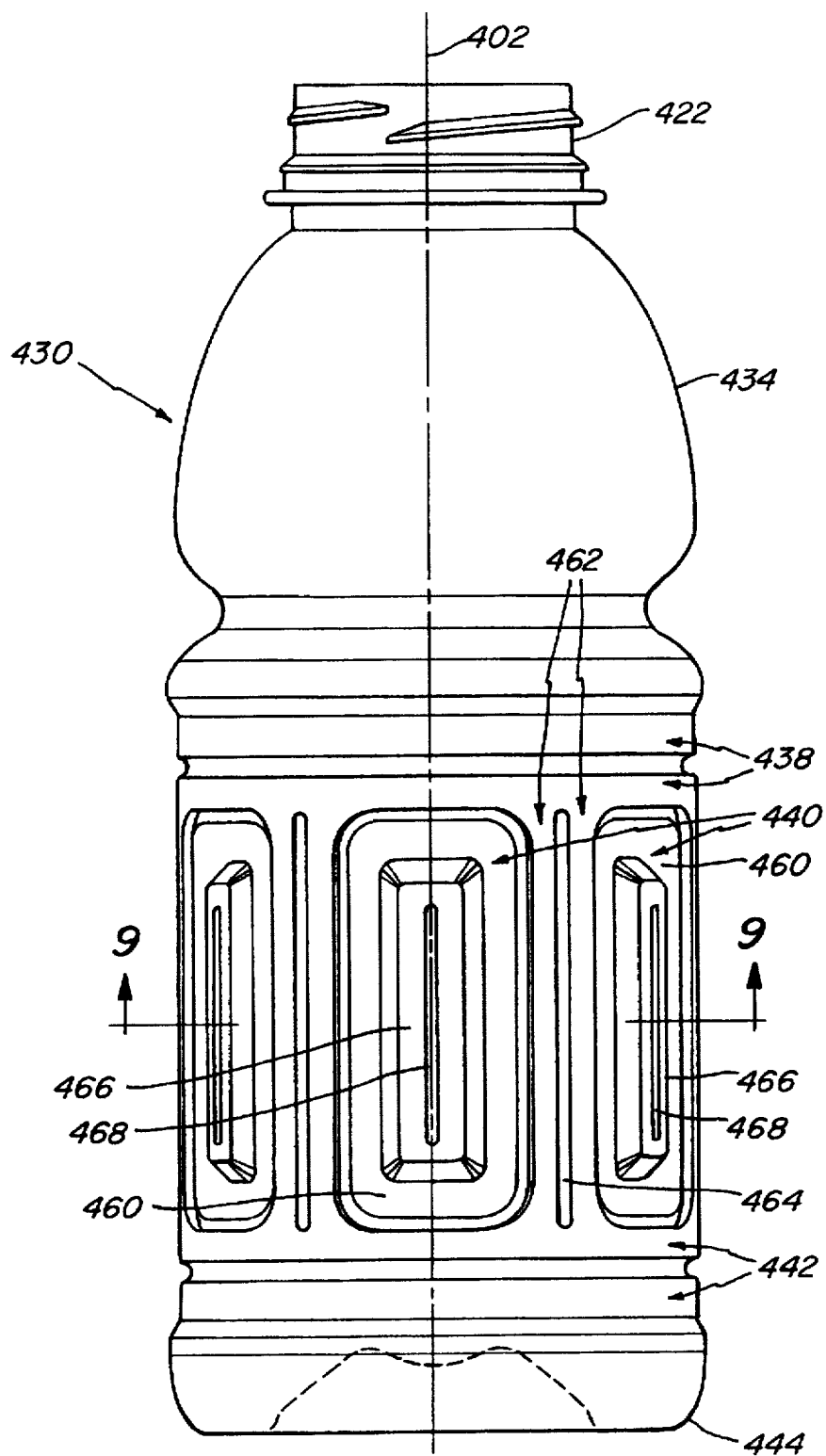
FIG. 8 is a front elevational view of another embodiment of the hot-fillable container of this invention, showing an alternative vacuum panel configuration having a raised central area incorporating a longitudinal panel rib.
Figure 9:
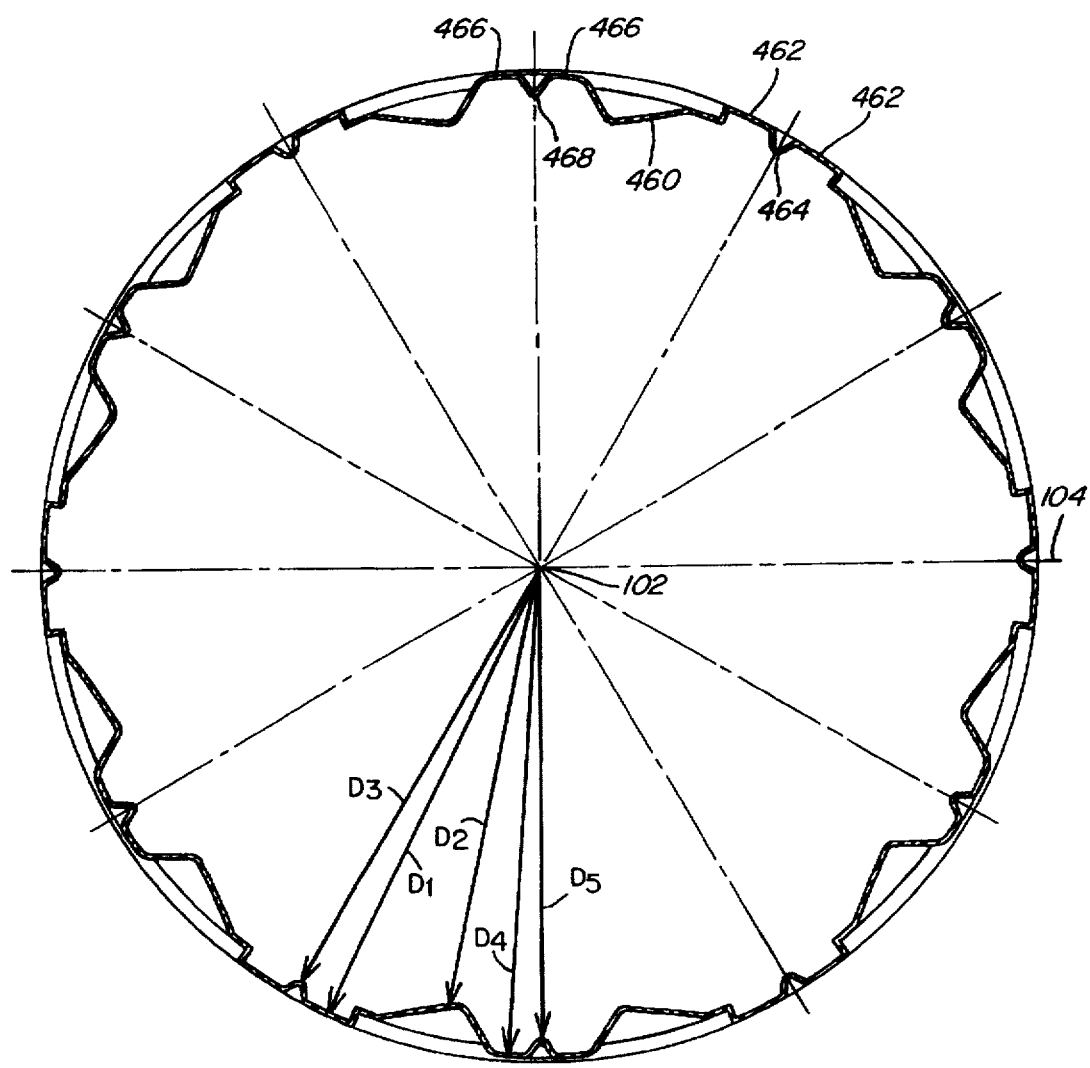
FIG. 9 is a cross-sectional view of the container of FIG. 8 taken along section line 9—9, showing the six vacuum panels separated by post areas.

FIGS. 8–9 shows front elevational and cross-sectional views respectively of a further alternative container 430 having a modified vacuum panel construction. Again, corresponding elements are given similar numbers as in FIG. 1 to form a "400" series. However, in this embodiment, each vacuum panel 440 further includes a vertically-elongated, rectangular raised wall 466 in the middle of recess 460, which is disposed at a fourth distance $D_4$ from the centerline 102 which is greater than the second distance $D_2$ of recess 460. In this example, $D_4$ is the same as the first distance $D_1$ of post wall 462. Raised wall 466 provides another area for supporting the label, along with the post walls 462 and upper and lower glue lands 438, 442. In addition, a vertically-elongated and recessed panel rib 468 in the center of raised wall 466 provides further longitudinal stiffness, said panel rib 468 being disposed at a distance $D_5$ from centerline 102, which is less than the first distance $D_1$ of the post wall 462 and raised wall 466.

Figure 10:
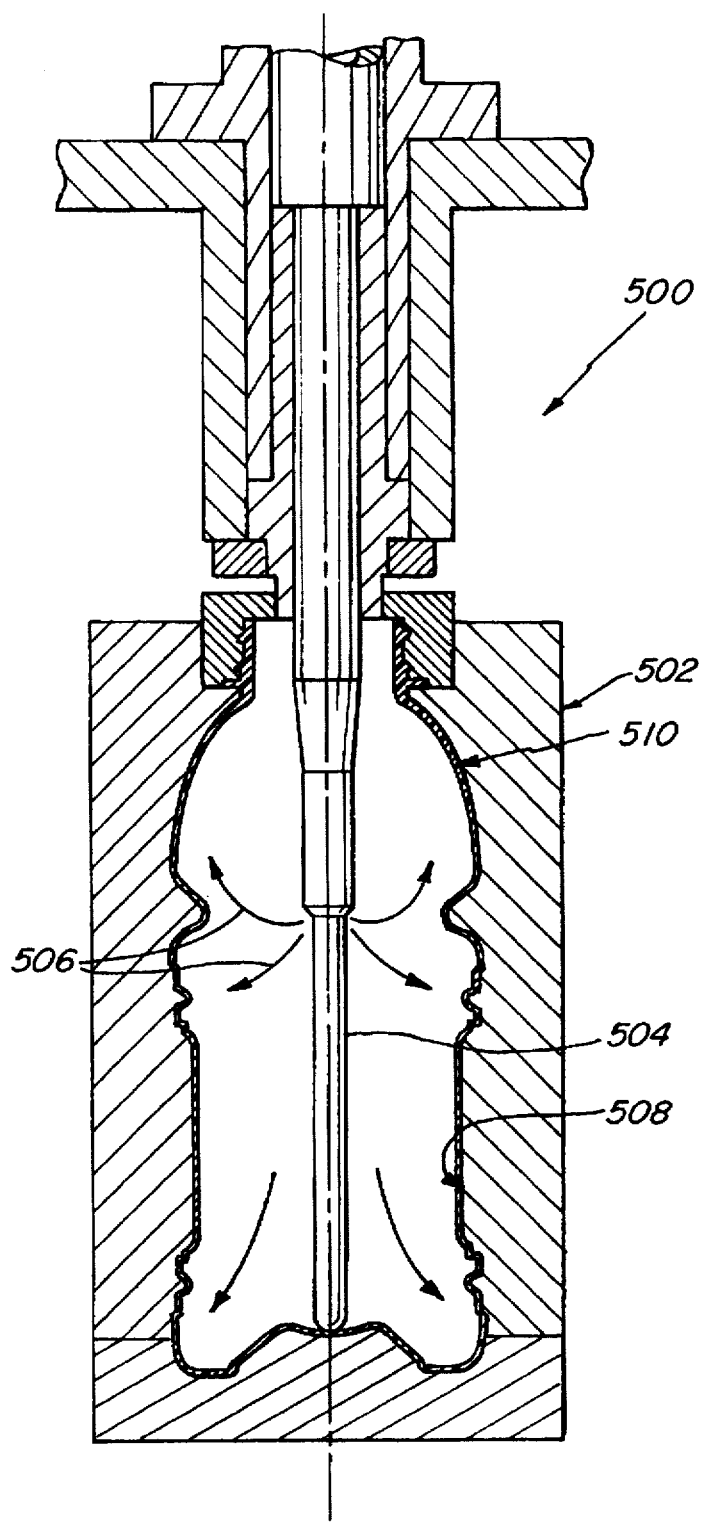
FIG. 10 is a cross-sectional view showing a molding apparatus for blow molding the container of this invention from a preform.

FIG. 10 illustrates a blow-molding apparatus 500 used in making the container of this invention. More specifically, a substantially amorphous and transparent PET preform 120 (see FIG. 1) is reheated to a temperature above the glass transition temperature and placed in a blow mold 502. A stretch rod 504 axially elongates the preform within the blow mold to ensure complete axial elongation and centering of the preform. A blowing gas (shown by arrows 506) is introduced to radially inflate the preform in a customary manner to match the configuration of the inner molding surface 508 of the blow mold. The formed container 510 remains substantially transparent but has undergone strain-induced crystallization to provide increased strength.

The container may be made of any of the known polymer resins which provide good strength at elevated fill temperatures, such as polyesters, polyolefins, polycarbonates, nitriles, and copolymers of the above, as well as other high temperature polymers.

Phthalic acid polyesters based on terephthalic or isophthalic acid are commercially available and convenient. The hydroxy compounds are typically ethylene glycol and 1,4-di-(hydroxymethyl)-cyclohexane. The intrinsic viscosity for phthalate polyesters are typically in the range of 0.6 to 1.2, and more particularly 0.7 to 1.0 (for O-chlorolphenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester. Conveniently, at least 90 mole percent will be terephthalic acid and at least 45 mole percent an aliphatic glycol or glycols, especially ethylene glycol.

Another useful polymer, with physical properties similar to PET, is polyethylene naphthalate (PEN). PEN provides a 3–5× improvement in oxygen barrier property (over PET), at some additional expense.

The container may be either a monolayer, or a multilayer construction, including layers of an oxygen barrier material such as ethylene vinyl alcohol or polyvinyledene chloride, and may include a layer of reprocessed scrap material, such as post-consumer or recycled PET.

The container may have a closure other than a screw threaded cap, such as a slidable nozzle as used on sports bottles.

Figure 11:
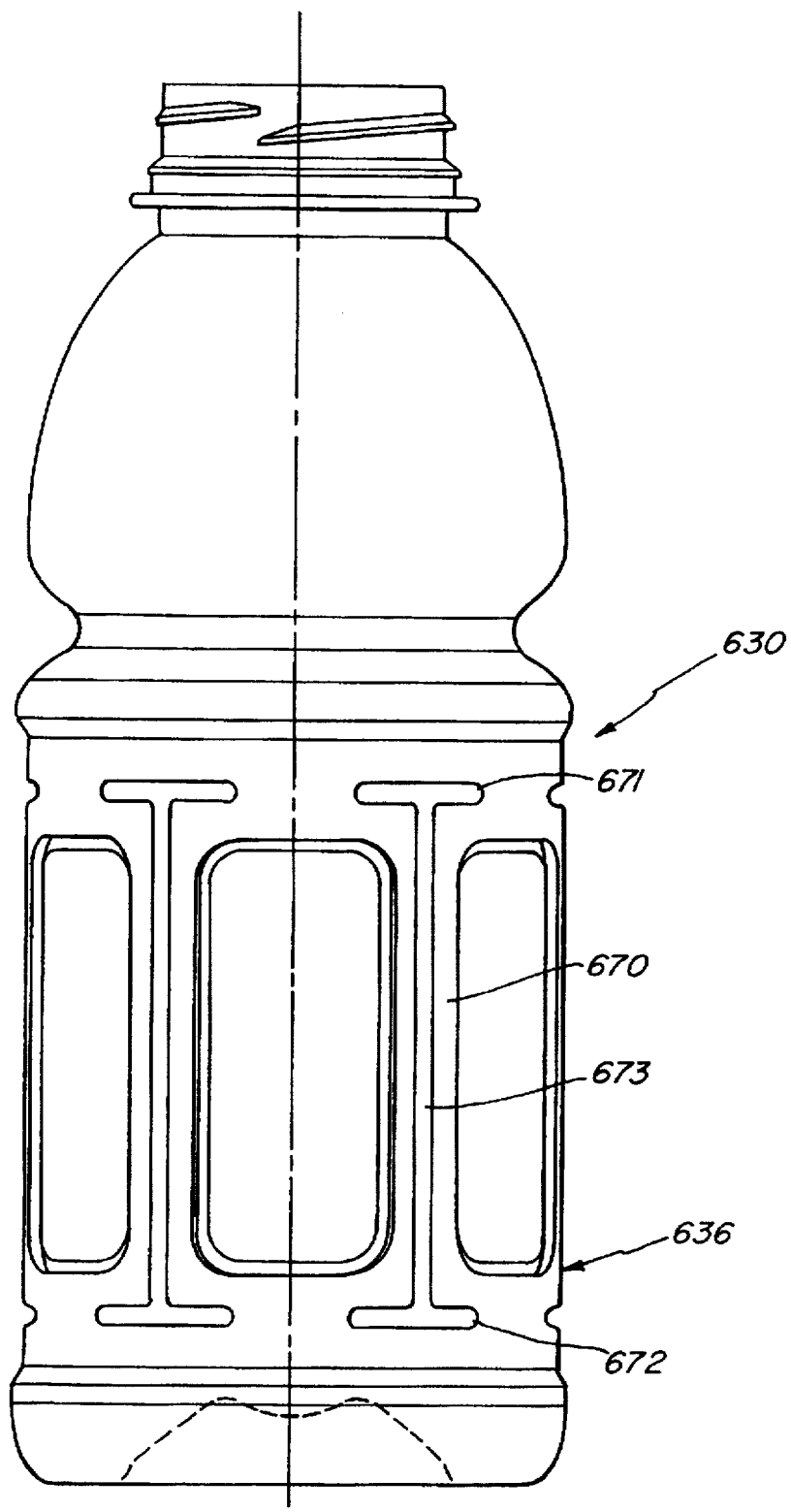
FIG. 11 is a front elevational view of a further embodiment of the hot-fillable container of this invention, showing an alternative panel configuration with interrupted radial hoop rib sections joined to longitudinal post ribs.
Figure 12:
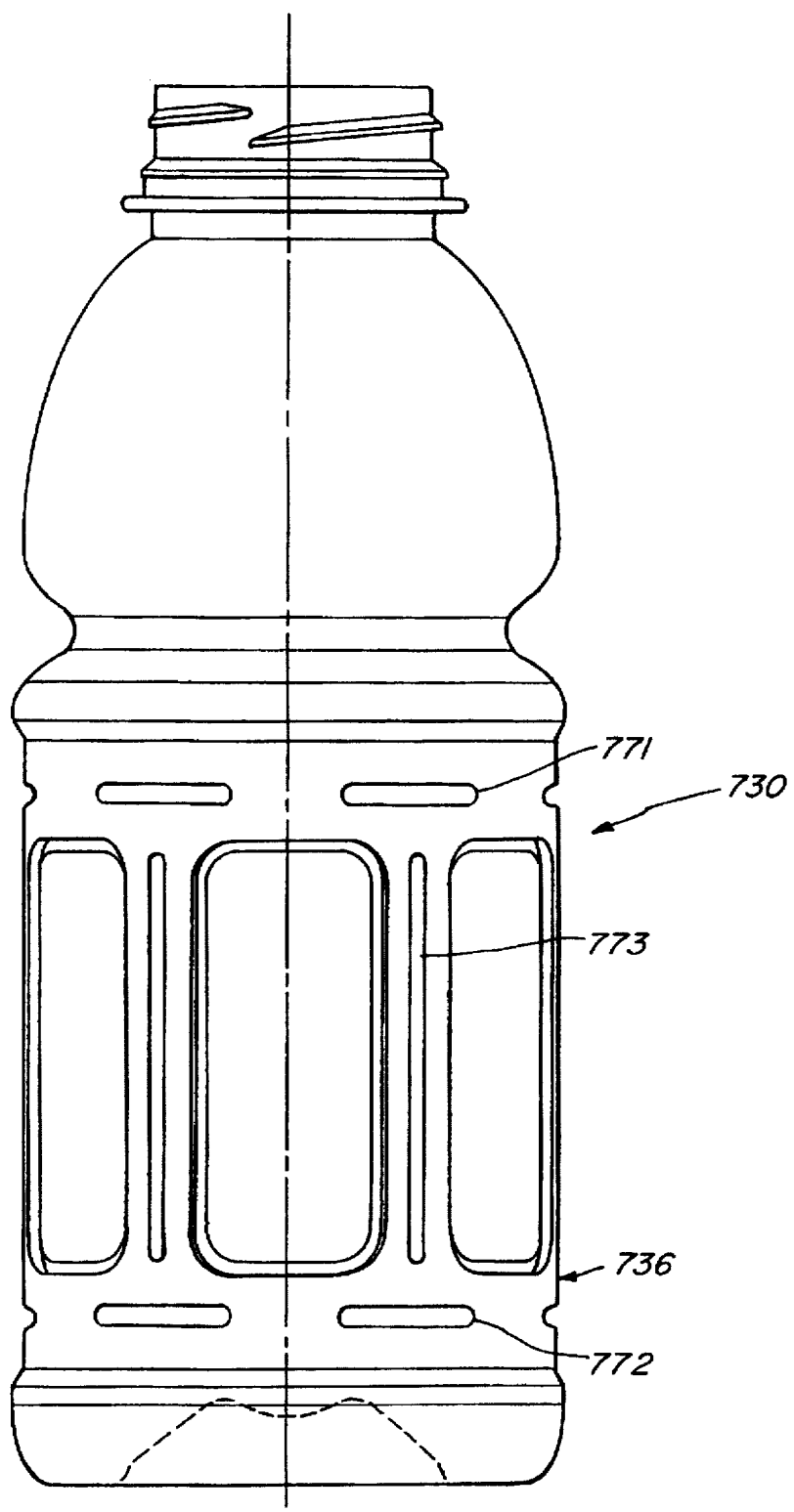
FIG. 12 is a front elevational view of a still further embodiment of the hot-fillable container of this invention, showing an alternative panel configuration with interrupted radial hoop rib sections disposed above and below longitudinal post ribs.

Two further alternative configurations for the radial hoop ribs and longitudinal post ribs are shown in FIGS. 11–12. Both incorporate an interrupted hoop rib which does not extend around the full circumference of the panel section, but rather comprises hoop rib sections disposed above and below the longitudinal post ribs. This provides resistance to ovalization and hoop collapse where greatest resistance is required, namely above and below the post wall areas. More specifically, FIG. 11 shows an alternative container 630 with panel section 636 having an "I-beam" shaped rib 670 which incorporates upper and lower horizontal hoop sections 671, 672 respectively which are joined by a longitudinal post rib section 673. FIG. 12 shows an alternative container 730 having panel section 736, with upper and lower horizontal hoop sections 771, 772 respectively centered above and below, but spaced from a longitudinal post rib 773.

Although certain preferred embodiments of the invention have been specifically illustrated and described herein, it is to be understood that variations may be made without departing from the spirit and scope of the invention as defined by the appended claims. For example, the container sizes and shapes may be varied as well as the vacuum panel design. Further, the containers may be other than bottles and they may be made from other thermoplastic resins or materials. Thus, all variations are to be considered as part of the invention as defined by the following claims.

We claim:

1. In a hot-fillable plastic container including a panel section having a substantially cylindrical panel circumference and a plurality of vacuum panels symmetrically disposed about and radially recessed with respect to the panel circumference, the panel section further including in the panel circumference post walls between the vacuum panels and land areas above and below the vacuum panels, the improvement comprising:

the panel section having a relatively tall and slender profile and a ratio of vacuum panel height D to panel section diameter C on the order of 0.85 to 1.05;

longitudinal post ribs in the post walls which are radially recessed with respect to the panel circumference;

the land areas each having a height E greater than on the order of 0.45 inch and the ratio of E to C being on the order of greater than 0.1; and circumferential hoop ribs in the land areas;

each post wall forming a first corner with an adjacent vacuum panel and a second corner with a post rib, and wherein the panel section has a wall thickness and the vacuum panels and post walls each have an angular extent selected to enable the first and second corners to open to reduce the hoop rigidity and allow the vacuum panels to move radially inward in a controlled deformation during the cooling portion of a hot-fill cycle.

2. The container of claim 1, wherein the panel section has a ratio of panel section height B to panel section diameter C on the order of 1.2 and greater.

3. The container of claim 2, wherein the panel section height B is on the order of 2.4 to 8 inches and the panel section diameter C is on the order of 2 to 6 inches.

4. The container of claim 3, wherein the panel section has a wall thickness on the order of 0.012 to 0.025 inches.

5. The container of claim 4, wherein the container has six vacuum panels.

6. The container of claim 5, wherein each vacuum panel has an angular extent of on the order of 39° to 46°.

7. The container of claim 6, wherein the first corner has a radial depth on the order of 0.030 to 0.100 inches.

8. The container of claim 7, wherein the second corner has a radial depth on the order of 0.030 to 0.100 inches.

9. The container of claim 3, wherein the number of vacuum panels are selected from the group consisting of four, six and eight.

10. The container of claim 9, wherein the number of vacuum panels is six.

11. The container of claim 1, wherein the circumferencial hoop ribs extend around the entire panel circumference.

12. The container of claim 1, wherein the circumferential hoop ribs comprise interrupted hoop rib sections above and below the post walls.

13. The container of claim 12, wherein the hoop rib sections extend over a portion of the vacuum panels.

14. The container of claim 12, wherein the hoop rib sections are connected to the longitudinal post ribs.

15. The container of claim 12, wherein the hoop rib sections are separate from the longitudinal post ribs.

16. The container of claim 1, wherein the longitudinal post ribs are of variable depth in the longitudinal direction, and have a greater depth adjacent a mid-portion of the panel section.

17. The container of claim 1, further including a label engaging the land areas and post walls.

18. The container of claim 1, wherein each of the vacuum panels has a raised central wall for supporting a label disposed around the panel section.

19. The container of claim 18, wherein the raised central wall has a longitudinal rib.

20. The container of claim 1, wherein the panel section is outwardly barrelled prior to application of a negative internal pressure within the container.

21. The container of claim 1, wherein the plastic is selected from the group consisting of polyesters, polyolefins, polycarbonates, polyethylene naphthalates, nitriles, and copolymers thereof.

22. The container of claim 1, wherein the container is a substantially transparent, biaxially-oriented, blow-molded polyester container.

23. The container of claim 22, wherein the polyester is substantially polyethylene terephthalate.

24. The container of any one of claims 1 to 4, wherein the first and second corners each have a radial depth adapted to increase the longitudinal bending resistance of the post wall.

25. The container of claim 24, wherein the radial depth of the first and second corners are each on the order of 0.030 to 0.100 inches.

26. The container of claim 24, wherein the angular extent of the post wall is adapted to increase the longitudinal bending resistance of the post wall.

27. The container of claim 26, wherein the container has six vacuum panels, and each vacuum panel has an angular extent on the order of 39° to 46°.

* * * * *